United States Patent
Yun

(10) Patent No.: US 9,785,148 B2
(45) Date of Patent: Oct. 10, 2017

(54) MOVING ROBOT AND CONTROLLING METHOD THEREOF

(71) Applicant: LG ELECTRONICS INC., Seoul (KR)

(72) Inventor: Hyungtae Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/990,618

(22) Filed: Jan. 7, 2016

(65) Prior Publication Data
US 2016/0320777 A1    Nov. 3, 2016

(30) Foreign Application Priority Data

Apr. 29, 2015   (KR) .................. 10-2015-0060760

(51) Int. Cl.
| | | |
|---|---|---|
| *G01S 15/88* | (2006.01) | |
| *G01S 15/87* | (2006.01) | |
| *G01S 15/93* | (2006.01) | |
| *G01S 7/54* | (2006.01) | |
| *G05D 1/02* | (2006.01) | |
| *A47L 11/40* | (2006.01) | |
| *A47L 9/28* | (2006.01) | |
| *G05D 1/00* | (2006.01) | |

(52) U.S. Cl.
CPC .......... *G05D 1/0214* (2013.01); *A47L 9/2805* (2013.01); *A47L 11/4011* (2013.01); *G01S 7/54* (2013.01); *G01S 15/876* (2013.01); *G01S 15/88* (2013.01); *G01S 15/931* (2013.01); *G05D 1/0088* (2013.01); *G05D 1/027* (2013.01); *G05D 1/0238* (2013.01); *G05D 1/0242* (2013.01); *A47L 2201/04* (2013.01); *G05D 2201/0203* (2013.01); *G05D 2201/0215* (2013.01)

(58) Field of Classification Search
CPC .... G05D 1/0238; G05D 1/0277; G05D 1/027; G05D 1/0242; G05D 2201/0215; G05D 1/0214; G05D 1/088; G05D 2201/0203; A47L 11/4011; G01S 15/88; G01S 15/931; G01S 7/54; G01S 15/876; G01S 13/881
See application file for complete search history.

(56) References Cited

U.S. PATENT DOCUMENTS 5,815,880 A * 10/1998 Nakanishi ............... A47L 11/20
15/319
6,594,844 B2 * 7/2003 Jones .................. G05D 1/0238
15/319
(Continued)

FOREIGN PATENT DOCUMENTS

EP      2 325 714 A2    5/2011
JP      2008-198071 A   8/2008
(Continued)

*Primary Examiner* — Russell Frejd
(74) *Attorney, Agent, or Firm* — Dentons US LLP

(57) ABSTRACT

A robot cleaner having a main body, a driving unit for moving the main body, a sensing unit for sensing information related to an obstacle, and a controller for controlling the driving unit to prevent collision of the main body with the obstacle. The controller controls the driving unit to reverse the main body with respect to the obstacle so as to prevent the main body from contacting the obstacle based on a distance between the main body and the obstacle.

17 Claims, 9 Drawing Sheets

(56) References Cited

U.S. PATENT DOCUMENTS

| | | | | |
|---|---|---|---|---|
| 7,761,954 B2* | 7/2010 | Ziegler | ............... | A47L 5/14 |
| | | | | 15/319 |
| 7,957,837 B2* | 6/2011 | Ziegler | ............... | B25J 5/007 |
| | | | | 318/568.1 |
| 8,862,271 B2* | 10/2014 | Shamlian | ............ | G05D 1/0238 |
| | | | | 700/245 |
| 2004/0076324 A1* | 4/2004 | Burl | ............... | G05D 1/0246 |
| | | | | 382/153 |
| 2009/0048727 A1 | 2/2009 | Hong et al. | | |
| 2012/0173070 A1* | 7/2012 | Schnittman | ......... | G05D 1/0227 |
| | | | | 701/26 |
| 2014/0257622 A1* | 9/2014 | Shamlian | ............ | G05D 1/0238 |
| | | | | 701/26 |
| 2014/0289992 A1* | 10/2014 | Ziegler | ............... | A47L 5/14 |
| | | | | 15/320 |
| 2015/0020326 A1* | 1/2015 | Schnittman | ............ | A47L 11/34 |
| | | | | 15/52.1 |
| 2015/0166060 A1* | 6/2015 | Smith | ............... | B60W 30/09 |
| | | | | 701/23 |
| 2015/0197012 A1* | 7/2015 | Schnittman | ......... | G05D 1/0227 |
| | | | | 700/250 |

FOREIGN PATENT DOCUMENTS

| | | |
|---|---|---|
| JP | 4910972 B2 | 4/2012 |
| KR | 10-1271315 B1 | 6/2013 |
| KR | 10-1455298 B1 | 10/2014 |
| WO | 01/91623 A2 | 12/2001 |

* cited by examiner

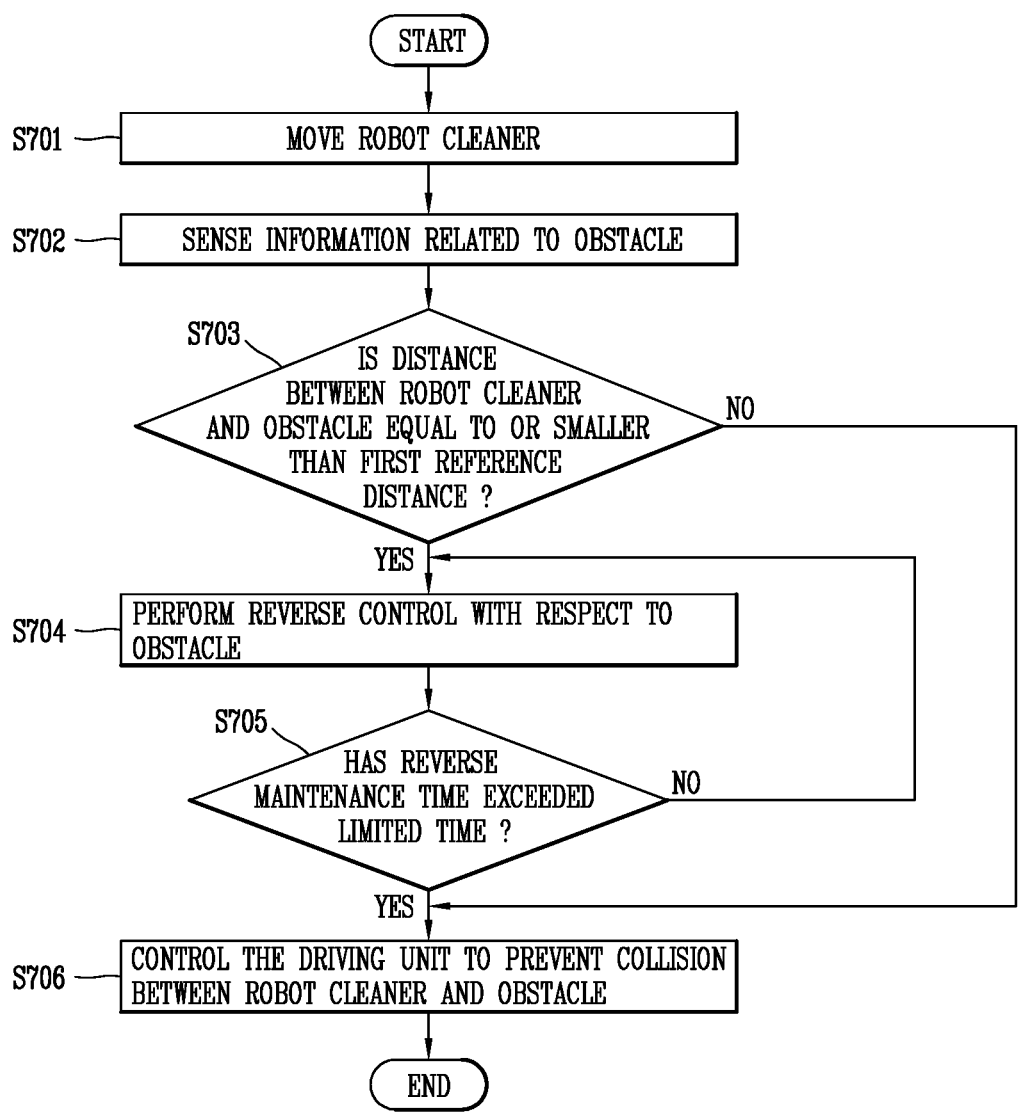

MOVING ROBOT AND CONTROLLING METHOD THEREOF

CROSS-REFERENCE TO RELATED APPLICATIONS

Pursuant to 35 U.S.C. §119 (a), this application claims the benefit of earlier filing date and right of priority to Korean Application No. 10-2015-0060760, filed in filed in Republic of Korea on Apr. 29, 2015, the entire contents of which are incorporated by reference for all purposes as if fully set forth herein.

BACKGROUND

Field of the Disclosure

The present disclosure relates to a moving robot and a controlling method thereof, and more particularly, to a robot cleaner and a controlling method thereof.

Description of the Conventional Art

In general, robots have been developed for industrial purposes to play a role in factory automation. Recently, application fields of robots have extended, and robots for medical purpose, space navigation robots, etc., and even home robots have been developed.

One example of a home robot is a robot cleaner. The robot cleaner is an electronic device that suctions dust or foreign materials therearound while traveling in a certain region. The robot cleaner generally includes a rechargeable battery and an obstacle sensor for avoiding a hindrance or an obstacle during traveling. Thus, the robot cleaner can perform cleaning while traveling by itself.

Recently, studies have actively conducted to apply robot cleaners to various fields such as health care, smart home, and remote control, beyond the role of performing cleaning while simply autonomously traveling a cleaning region.

SUMMARY

Therefore, an aspect of the detailed description is to provide a robot cleaner and a controlling method thereof, which can prevent collision of the robot cleaner with an obstacle.

Another aspect of the detailed description is to provide a robot cleaner and a controlling method thereof, which can perform an avoidance operation with respect to an obstacle without any influence of friction between the floor and driving wheels of the robot cleaner and a sensor error of the robot cleaner.

To achieve these and other advantages and in accordance with the purpose of this specification, as embodied and broadly described herein, a robot cleaner includes: a main body; a driving unit configured to move the main body; a sensing unit configured to sense information related to an obstacle; and a controller configured to control the driving unit to prevent collision of the main body with the obstacle, wherein the controller controls the driving unit to reverse the main body with respect to the obstacle so as to prevent the collision of the main body with the obstacle, based on a distance between the main body and the obstacle.

In one exemplary embodiment, when the distance from a rotational center of the main body to the obstacle is equal to or smaller than a first reference distance, the controller may control the driving unit to reverse the main body with respect to the obstacle.

In one exemplary embodiment, the first reference distance may correspond to a radius of rotation of the robot cleaner.

In one exemplary embodiment, when the main body is reversed, the controller may control the driving unit such that a front surface of the main body is spaced apart from the obstacle at a predetermined gap or less.

In one exemplary embodiment, the predetermined gap may correspond to the radius of rotation.

In one exemplary embodiment, when the main body is reversed, the controller may calculate a time for which the reverse of the main body is maintained. If the calculated time exceeds a predetermined limited time, the controller may control the driving unit to stop the main body.

In one exemplary embodiment, if the distance between the main body and the obstacle is decreased to a third reference distance or less, the controller may control the driving unit to decrease a speed of the robot cleaner.

In one exemplary embodiment, the controller may detect information related to the size of the obstacle by using the sensed information, and set information related to the third reference distance, based on the detected information.

In one exemplary embodiment, the sensing unit may include a signal transmitting portion for emitting a predetermined wave to the obstacle and a signal receiving portion for receiving the wave reflected by the obstacle. The controller may detect the information related to the size of the obstacle by comparing the emitted wave with the received wave.

In one exemplary embodiment, if the distance between the main body and the obstacle is decreased to a second reference distance 302 or less, the controller may control the driving unit to stop the main body.

In one exemplary embodiment, when the main body is reversed after being stopped, the controller may control the driving unit to reverse the main body up to a point at which the stop of the main body has been started.

In one exemplary embodiment, the controller may set information related to the second reference distance by using information related to at least one of a radius of rotation of the main body and a braking distance of the main body.

In one exemplary embodiment, the controller may control the driving unit to perform an operation for preventing the collision of the main body with the obstacle by rotating the main body by a predetermined angle after the reverse of the main body is completed.

To achieve these and other advantages and in accordance with the purpose of this specification, as embodied and broadly described herein, a method for controlling a robot cleaner includes: moving a main body; sensing information related to an obstacle located in a moving direction of the main body; calculating a distance between the main body and the obstacle by using the sensed information; determining whether the calculated distance is equal to or smaller than a first reference distance value; if the calculated distance is equal to or smaller than the first reference distance value, reversing the main body with respect to the obstacle; and performing an operation for preventing collision of the main body with the obstacle.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 7 is a flowchart illustrating an embodiment of the invention of a controlling method of the robot cleaner.

DETAILED DESCRIPTION OF THE EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1A:
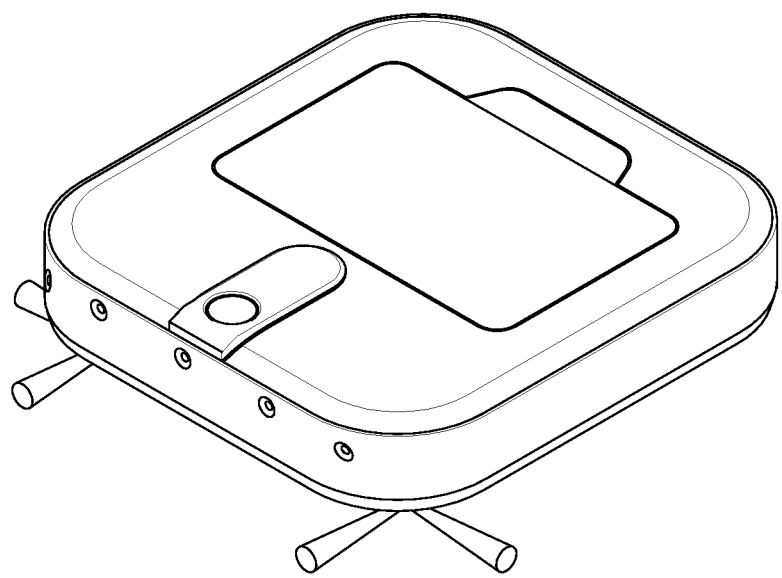
FIG. 1A is a perspective view illustrating an external appearance of a robot cleaner according to an exemplary embodiment.
Figure 1B:
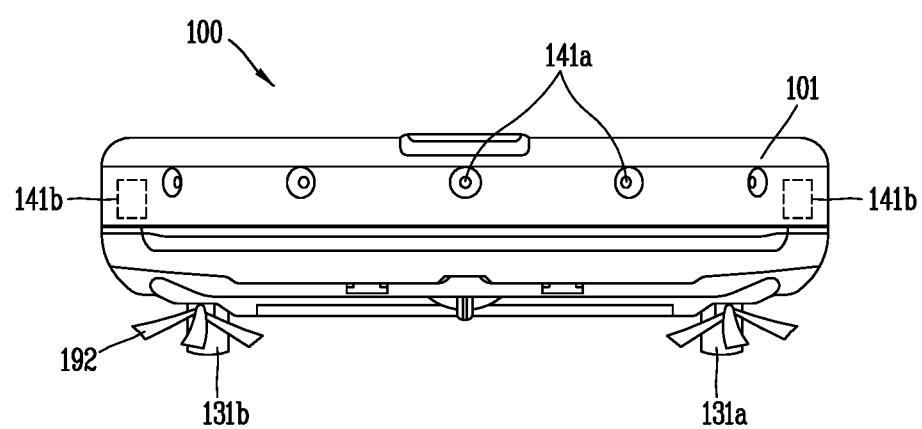
FIG. 1B is a front view illustrating an external appearance of the robot cleaner according to an embodiment of the invention.
Figure 1C:
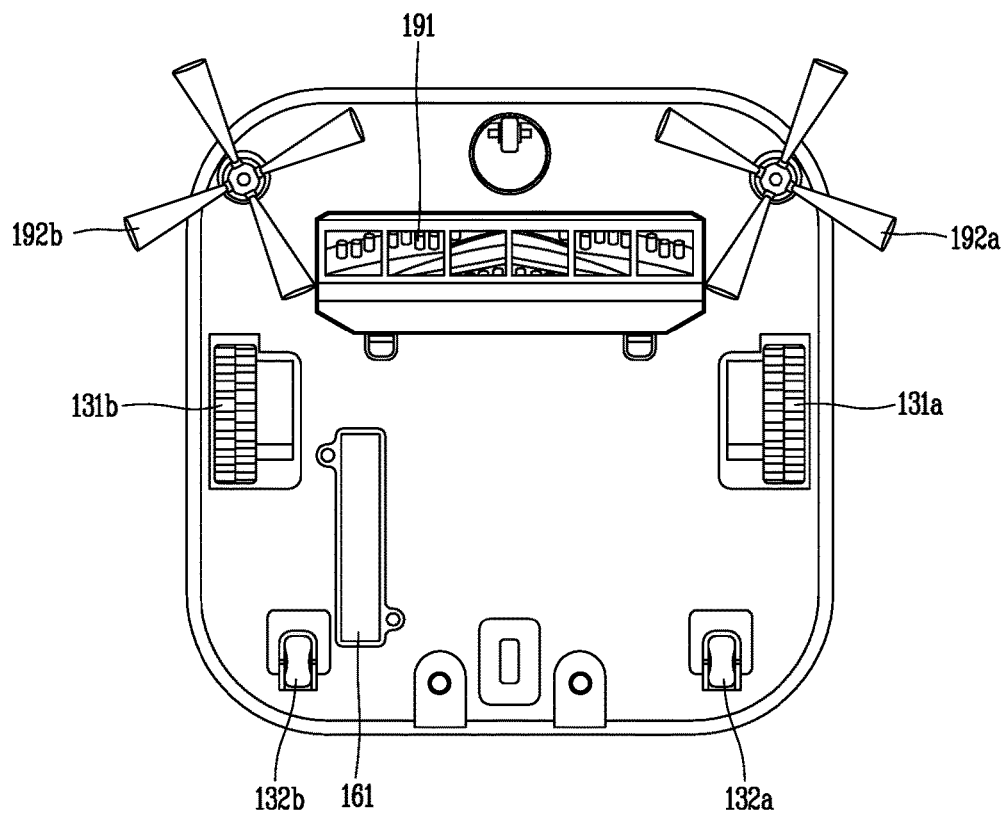
FIG. 1C is a rear view illustrating an external appearance of the robot cleaner according to the embodiment.

FIGS. 1A to 1C are respectively perspective, front, and rear views illustrating external views of a robot cleaner according to an exemplary embodiment.

Robot cleaner 100 may include a cleaning unit 190 to suction and clean dust or foreign materials.

Cleaning unit 190 further includes a rotary brush rotatably mounted or attached at a lower portion of a main body of robot cleaner 100, and side brushes 192 for cleaning edges or corners in a cleaning region such as a wall surface while rotating about a vertical rotational axis of the main body of robot cleaner 100.

Rotary brush 191 allows dust on a floor or carpet to be floated in the air while rotating about a horizontal axis of the main body of robot cleaner 100. A plurality of blades are spirally provided on the outer circumferential surface of rotary brush 191. Brushes may be provided between the spiral blades. Since rotary brush 191 and side brushes 192 have different rotational axes, the robot cleaner is generally to be provided with motors for respectively driving the rotary bush and the side brushes.

For example, as shown in FIGS. 1B and 1C, side brushes 192 may be disposed or provided at both sides of rotary brush 191, and an electromotive means for transmitting rotary power of rotary brush 191 to side brushes 192 may be provided between rotary brush 191 and side brushes 192, so that rotary brush 191 and side brushes 192 can all be driven by using one brush motor. In this case, a worm and a worm gear may be used as the electromotive means, or a belt may be used as the electromotive means.

Figure 1D:
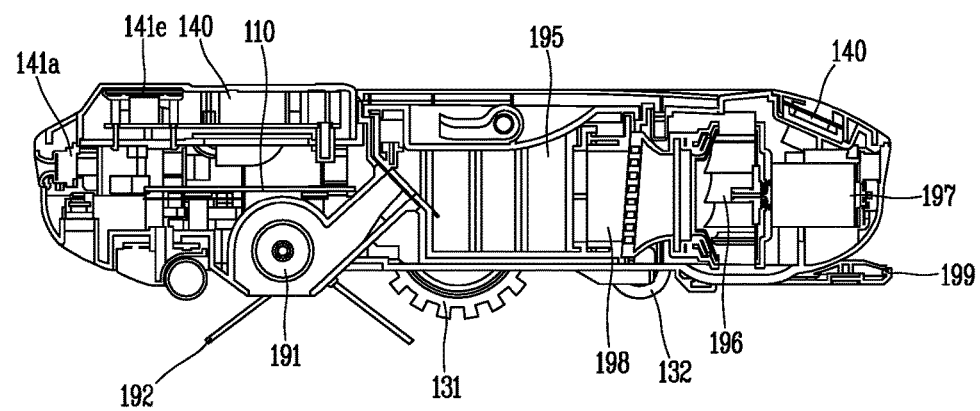
FIG. 1D is a side sectional view illustrating an inside of the robot cleaner according to the embodiment.

Cleaning unit 190, as shown in FIG. 1D, includes a dust container 195 for storing collected dust, a suction fan 196 for providing power for suctioning dust in a cleaning region, and a suction motor 197 for suctioning air by rotating suction fan 196. Thus, cleaning unit 190 can suction dust or foreign materials therearound.

Suction fan 196 includes a plurality of wings for allowing air to flow, and a member formed in a ring shape at the upstream periphery of the plurality of wings to connect the plurality of wings to each other, the member guiding air flowed into the suction fan in the central axial direction of the suction fan to be flowed in a direction perpendicular to the central axis of the suction fan.

In this case, cleaning unit 190 is formed in an approximately rectangular parallelepiped shape, and may further include a filter 198 for filtering dirt or dust in the air.

Filter 198 may be divided into a first filter and a second filter, when necessary, and a bypass filter may also be formed in a main body constituting filter 198. The first filter and the second filter may be mesh filters or HEPA filters. The first filter and the second filter may be formed as one of a non-woven filter, a paper filter, and the like, or use together two or more thereof.

A controller 180 may sense a state of dust container 195. Specifically, controller 180 may sense a state how much dust is contained in dust container 195 and a state whether dust container 195 is attached to or detached from robot cleaner 100. In the former case, the state may be sensed by inserting a piezoelectric sensor, etc. into dust container 195. In the latter case, the state may be sensed, in various forms. For example, a micro-switch installed at the bottom surface of a groove having dust container 195 mounted or attached therein to be turned on/off, a magnetic sensor using the magnetic field of a magnet, an optical sensor having a light emitting portion and a light receiving portion to receive light, and the like may be used as a sensor for sensing whether dust container 195 is attached to or detached from robot cleaner 100. In the case of the magnetic sensor, a sealing member made of a synthetic rubber material may be further provided at a portion to which the magnet is adhered.

Cleaning unit 190 may further include a dustcloth plate 199 separably mounted or attached at a lower portion of the main body of robot cleaner 100. Dustcloth plate 199 may include a dustcloth separably mounted or attached thereto, and a user may separate the dustcloth from dustcloth plate 199 to wash or replace the dustcloth. The dustcloth may be mounted or attached in various manners, but attached to dustcloth plate 199 by using non-woven fabric called VEL-CRO®. For example, dustcloth plate 199 is mounted or attached to the main body of the robot cleaner by magnetism of the main body of robot cleaner 100. A first magnet may be provided in dustcloth plate 199, and a metal member or second magnet corresponding to the first magnet may be provided in the main body of the robot cleaner. If dustcloth plate 199 is normally located at the bottom of the main body of robot cleaner 100, dustcloth plate 199 is fixed to the main body of robot cleaner 100 by the first magnet and the metal member or the first and second magnets.

Robot cleaner 100 may further include a sensor for sensing whether dustcloth plate 199 is mounted or attached to the main body of robot cleaner 100. For example, the sensor may be a lead switch operated by magnetism, a hall sensor, or the like. For example, as dustcloth plate 199 is mounted or attached to the main body of robot cleaner 100, the lead switch provided to the main body of robot cleaner 100 may be operated to output a mounting signal to controller 180.

Meanwhile, robot cleaner 100, as shown in FIG. 1B, may include main wheels 131a and 131b respectively disposed or provided at both left and right sides of a lower portion thereof such that the main body is movable. A driving unit 130 is connected to left and right main wheels 131a and 131b, and includes a motor (e.g., a wheel motor) for rotating main wheels 131a and 131b. Driving unit 130 drives the motor, to rotate or move the main body.

Here, the wheel motor is preferably provided in plurality to be respectively connected to main wheels 131a and 131b. In this case, the plurality of wheel motors may be independently operated to individually control the main wheels.

Robot cleaner 100 may further include one or more auxiliary wheels 132a, and 132b disposed or provided at the rear thereof. Auxiliary wheels 132a, and 132b may assist robot cleaner 100 to smoothly move by supporting the main body of robot cleaner 100 and minimizing friction between the bottom surface of the main body and a floor surface (e.g., surface to be cleaned).

In addition, handles may be respectively provided at edges of lower portions of the main body, e.g., both sides of main wheels 131a and 131b such that the user can more easily hold robot cleaner 100.

Figure 1E:
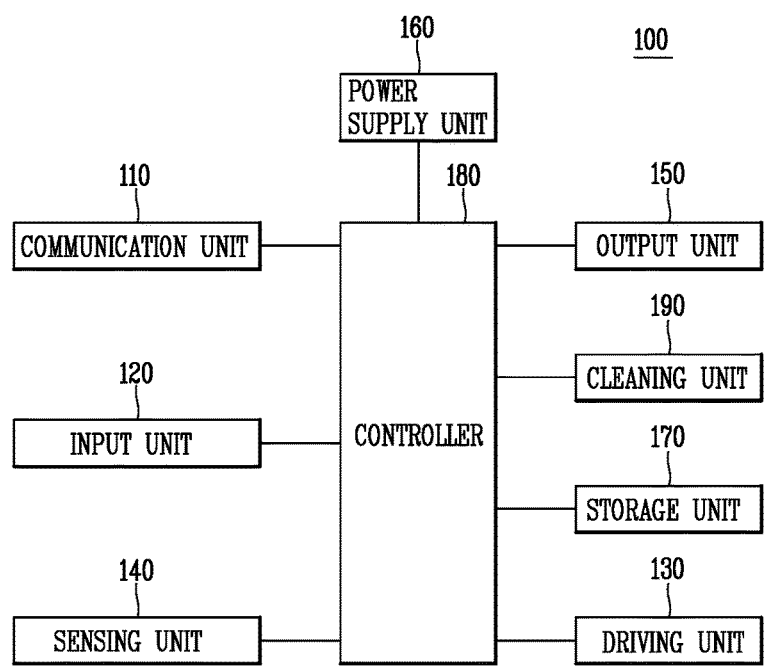
FIG. 1E is a block diagram illustrating a configuration of the robot cleaner according to the embodiment.

FIG. 1E is a block diagram illustrating a configuration of the robot cleaner according to the exemplary embodiment.

As shown in FIG. 1E, robot cleaner 100 may include at least one of a communication unit 110, an input unit 120, a driving unit 130, a sensing unit 140, an output unit 150, power supply unit 160, a storage unit 170, controller 180, and cleaning unit 190, or any combination thereof.

In this case, the components shown in FIG. 1E are not essential, and therefore, it will be apparent that a robot cleaner having a larger number of components or a smaller number of components may be implemented. Hereinafter, each of the components will be described.

First, power supply unit 160 includes a battery 161 rechargeable by external commercial power to supply power to robot cleaner 100. Power supply unit 160 may supply driving power to each component included in robot cleaner 100, thereby supplying operating power required when robot cleaner 100 travels or performs a cleaning operation.

In this case, controller 180 may sense remaining power of battery 161. If the remaining power is insufficient, controller 180 may control the robot cleaner to move to a charging base connected to an external commercial power source, so that battery 161 can be charged by receiving charging current supplied from the charging base. Battery 161 is connected to a battery sensing unit such that a remaining amount of the battery and a charging state of the battery can be transmitted to controller 180. As shown in FIG. 1A, controller 180 may control output unit 150 to display the remaining amount of the battery on a display screen.

Battery 161 may be located at a lower portion of the center of robot cleaner 100 or located at any one of left and right sides such that dust container 195 is located at the lowermost end of the main body. In the latter case, robot cleaner 100 may further include a balance weight so as to prevent weight unbalance of the battery.

Meanwhile, driving unit 130 includes motors and drives the motors, so that left and right main wheels 131a and 131b are rotated in both directions, thereby rotating or moving the main body.

Meanwhile, input unit 120 receives various control commands on robot cleaner 100, which are input from the user. Input unit 120 may include one or more buttons or controls. For example, input unit 120 may include an OK button, a setting button, etc. The OK button is a button for receiving, from the user, sensing information, obstacle information, location information, or a command for confirming a cleaning area or a cleaning map. The setting button is a button for receiving, from the user, a command for setting the information.

Also, input unit 120 may include an input reset button for canceling a previous user input and again receiving a user input, a delete button for deleting a previously set user input, a cleaning start button, a cleaning stop button, a reservation button for setting or deleting reservation information, a button for setting or changing a cleaning mode, a button for allowing the robot cleaner to return to the charging base, and the like.

Input unit 120, as shown in FIGS. 1A and 1D, input unit 120 may be installed as a hard key, a soft key, a touch pad, etc., at an upper portion of robot cleaner 100. Also, input unit 120 may be, together with output unit 150, a touch screen display.

Figure 1F:
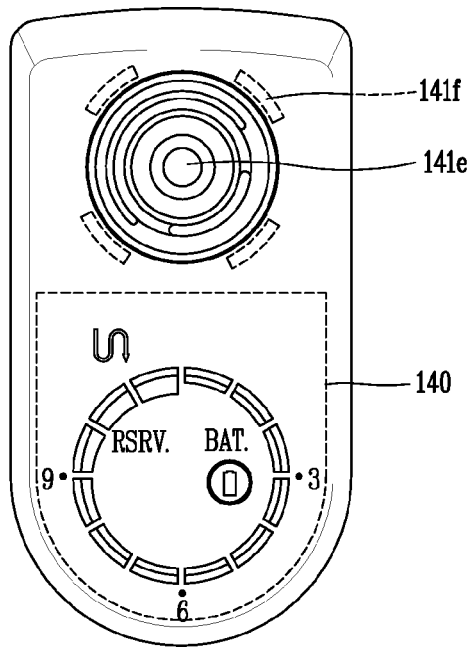
FIG. 1F is an enlarged view illustrating an output unit of the robot cleaner according to the embodiment.

Meanwhile, output unit 150, as shown in FIG. 1A, may be provided on the upper portion of robot cleaner 100. It will be apparent that the installation position or installation form of output unit 150 may vary. For example, output unit 150, as shown in FIG. 1F, may display, on a screen, reservation information, a battery state, and a cleaning method or a traveling method such as intensive cleaning, a space extension, or a zigzag operation.

Output unit 150 may output internal state information of robot cleaner 100, sensed by sensing unit 140, e.g., a current state of each of the components included in the robot cleaner and a current cleaning state. Also, output unit 150 may display, on a screen, external state information, obstacle information, location information, a cleaning area, a cleaning map, etc., sensed by sensing unit 140. Output unit 150 may be configured as any one element among a light emitting diode (LED), a liquid crystal display (LCD), a plasma display panel (PDP), and an organic light emitting diode (OLED).

Output unit 150 may further include a sound output means for acoustically outputting a process or result of an operation of robot cleaner 100, which is performed by controller 180. For example, output unit 150 may output a warning sound to the outside in response to a warning signal generated by controller 180.

In this case, the sound output means may be a means for outputting sounds, such as a beeper or a speaker. Output unit 150 may output sounds to the outside through the sound output means by using audio data, message data, or the like, which has a predetermined pattern stored in storage unit 170.

Thus, robot cleaner 100 can output, on a screen or as a sound, a cleaning map and/or environment information on a cleaning area through output unit 150. According to another exemplary embodiment, robot cleaner 100 may transmit the cleaning map and/or the environment information to a terminal device through a second communication unit such that the terminal device outputs a screen or sound to be output through output unit 150.

Accordingly, when environment information detected by an environment information detection unit is out of a predetermined range, controller 180, as described later, can visually or acoustically output an alarm signal to the outside through output unit 150. According to another exemplary embodiment, when environment information is out of the predetermined range, controller 180 may transmit the alarm signal to the terminal device, and the terminal device receiving the alarm signal may visually or acoustically output the alarm signal.

Meanwhile, communication unit 110 is connected to the terminal device and/or another device (in this specification, will be used together with "electronic devices") located in a cleaning area in one communication scheme among wired, wireless, and satellite communication schemes, to transmit/receive signals and data to/from the device.

Communication unit 110, as shown in FIG. 1E, may include a first communication unit and a second communication unit. The first communication unit and the second communication unit are divided according to a corresponding node transmitting/receiving data to/from robot cleaner 100. The first communication unit and the second communication unit may use the same communication scheme. The first communication unit and the second communication unit may be configured as one module.

The first communication unit may transmit/receive data to/from another device located in a cleaning area. In this case, the device may be any device that can transmit/receive data by being connected to a network. For example, the device may be a device such as an air conditioning device, a heating device, an air purifying device, an electric lamp, a TV, or a car. Also, the device may be a device for controlling a door, a window, a water supply valve, a gas supply valve, etc. Also, the device may be a sensor, etc., which senses temperature, humidity, air pressure, gas, etc.

Thus, controller 180 can transmit a control signal to the device through the first communication unit, and accordingly, the device can operate in response to the received control signal. For example, when the device is an air conditioning device, the air conditioning device may turn on power or perform cooling or heating on a cleaning area in response to a control signal. When the device is a device for controlling a window, the device may open/close the window or open the window at a certain rate in response to a control signal.

The first communication unit may receive various state information, etc. from at least one device located in a cleaning area. For example, the first communication unit may receive a setting temperature of the air conditioning device, opening/closing information representing whether the window is opened or closed or how much the window is opened, a current temperature of the cleaning area, sensed by a temperature sensor, etc.

Accordingly, controller 180 can generate a control signal for the device according to the state information, a user input through input unit 120, or a user input through the terminal device.

In order to communicate with at least one device, the first communication unit may employ at least one communication scheme among wireless communication schemes such as radio frequency (RF) communication, Bluetooth, infrared communication (IrDA), wireless LAN, and Zigbee. Accordingly, the device and robot cleaner 100 can construct at least one network. In this case, the network is preferably Internet.

The second communication unit may receive a control signal from the terminal device. Accordingly, controller 180 can perform a command for creating a cleaning map, traveling in a cleaning area, performing cleaning, etc. in response to the control signal received through the second communication unit. For example, a control command to be input from the user through input unit 120 may be received from terminal device 200 through the second communication unit, and controller 180 may perform the received control command. Also, the second communication unit may transmit, to the terminal device, state information of robot cleaner 100, obstacle information, location information, image information, a cleaning map, etc. For example, various information to be output through output unit 150 may be transmitted to the terminal device through the second communication unit.

In order to communicate with a computer, such as a laptop computer, a display device, and a terminal device, such as a mobile terminal (e.g., a smart phone), the second communication unit may employ at least one communication scheme among wireless communication schemes such as radio frequency (RF) communication, Bluetooth, infrared communication (IrDA), wireless LAN, and Zigbee. Accordingly, the device and robot cleaner 100 can construct at least one network. In this case, the network is preferably Internet. For example, when the terminal device is a mobile terminal, robot cleaner 100 may communicate with the terminal device through the second communication unit using a communication scheme which the mobile terminal uses.

Meanwhile, storage unit 170 stores a control program for controlling or driving robot cleaner 100 and data corresponding data. Storage unit 170 may store audio information, image information, obstacle information, location information, cleaning areas, cleaning maps, and the like. Also, storage unit 170 may store cleaning method, traveling methods, and the like.

Storage unit 170 is preferably a non-volatile memory. Here, the non-volatile memory (NVM, NVRAM) is a storage device capable of continuously maintaining stored information even when no power is supplied. For example, the non-volatile memory may include ROM, a flash memory, a magnetic computer memory device (e.g., a hard disk, a diskette drive, and a magnetic tape), an optical disk drive, magnetic RAM, PRAM, etc.

Meanwhile, sensing unit 140 may include at least one of an external signal sensor, a front sensor, a cliff sensor, a lower camera sensor, and an upper camera sensor.

The external signal sensor may sense external signals of the robot cleaner. For example, the external signal sensor may be an infrared ray sensor, an ultrasonic sensor, an RF sensor, etc.

Robot cleaner 100 may receive a guide signal generated from the charging base by using the external signal sensor, thereby checking a position and a direction of the charging base relative to the robot cleaner 100. In this case, the charging base may generate a guide signal instructing a direction and a distance thereof such that the robot cleaner can return to the charging base. That is, robot cleaner 100 receives the guide signal generated from the charging base to check a current position, and set a moving direction to return to the charging base.

Also, robot cleaner 100 may sense a signal generated from a remote control device, such as a remote controller or a terminal, by using the external signal sensor.

The external signal sensor may be provided inside or outside robot cleaner 100. For example, the infrared ray sensor may be installed inside robot cleaner 100, below output unit 150, or at the periphery of upper camera sensor 141e.

Meanwhile, the front sensor is installed on a front surface of robot cleaner 100, specifically, on a side circumferential surface with a predetermined gap therebetween. The front sensor is located on at least one surface of robot cleaner 100 to sense an obstacle located at the front of robot cleaner 100. The front sensor may sense an object, particularly an obstacle in a moving direction of the robot cleaner, and transmit sensing information to controller 180. That is, the front sensor may sense a protrusion, a home appliance, furniture, a wall surface, a wall edge, etc., which are disposed or provided along a moving path of robot cleaner 100, and transmits sensing information to controller 180.

The front sensor may be an infrared ray sensor, an ultrasonic sensor, an RF sensor, a terrestrial magnetism sensor, etc. Robot cleaner 100 may use, as the front sensors, one type of sensors, or two or more types of sensors.

For example, ultrasonic sensor 141a is generally used to sense an obstacle which is at a remote distance. Ultrasonic sensor 141a is provided with a signal transmitting portion and a signal receiving portion. Controller 180 may determine whether an obstacle exists based on whether an ultrasonic wave emitted from the signal transmitting portion has been received by the signal receiving portion after being reflected by an obstacle, etc. Then, controller 180 may calculate a distance of robot cleaner 100 from the obstacle by using emission and reception times of the ultrasonic wave.

Also, controller 180 may detect information related to a size of the obstacle by comparing the ultrasonic wave emitted from the signal transmitting portion with the ultrasonic wave received by the signal receiving portion. For example, controller 180 may determine that the size of the obstacle becomes larger as a larger number of ultrasonic waves are received by the signal receiving portion.

As shown in FIG. 1A or 1B, a plurality (e.g., five) of ultrasonic sensors 141a may be installed on a front outer circumferential surface of robot cleaner 100. In this case, the supersonic sensors may be preferably provided with signal transmitting portions (e.g., signal transmitters) and signal receiving portions (e.g., signal receivers) alternately installed on a front surface of robot cleaner 100.

That is, the signal transmitting portions may be disposed or provided at right and left sides based on the front center of the main body. Also, one or two or more signal transmitting portions are disposed or provided between the signal receiving portions, thereby forming a reception region with respect to an ultrasonic signal reflected from an obstacle. Under this configuration, a reception region may be expanded in a state that the number of the sensors is reduced. An emitting angle of a supersonic wave may be maintained within a range not influencing on other signals for prevention of crosstalk. Reception sensitivities of the signal receiving portions may be differently set.

The ultrasonic sensor may be installed toward an upper side at a predetermined angle such that an ultrasonic wave emitted from the ultrasonic sensor may be upwardly outputted. In this case, the ultrasonic sensor may further include a predetermined shielding member configured to prevent an ultrasonic wave from being downwardly emitted.

Meanwhile, the front sensor, as described above, may use two or more types of sensors. The front sensor may use any one type of sensors among an infrared sensor, an ultrasonic sensor, an RF sensor, and the like.

For example, as shown in FIG. 1A or 1B, the front sensor may include an infrared sensor 141b as another type of sensor, in addition to ultrasonic sensor 141a.

Infrared sensor 141b, as shown in FIG. 1B, may be installed, together with ultrasonic sensor 141a, on an outer circumferential surface of the robot cleaner. Infrared sensor 141b may also sense an object at a front or side of the robot cleaner, and transmit sensing information to controller 180. That is, infrared sensor 141b may sense a protrusion, a home appliance, furniture, a wall surface, a wall edge, etc., which are disposed or provided along a moving path of the robot cleaner, and transmits sensing information to controller 180. Thus, robot cleaner 100 can move within a cleaning area without any collision (e.g., contact) of the main body with an obstacle.

Meanwhile, the cliff sensor is disposed or provided on a bottom surface of robot cleaner 100, and it will be apparent that the cliff sensor may be installed at another position according to a type of robot cleaner 100. The cliff sensor is located on a bottom surface of robot cleaner 100 to sense an obstacle on the ground. The cliff sensor may be an infrared sensor having a signal transmitting portion and a signal receiving portion, an ultrasonic sensor, an RF sensor, a position sensitive detector (PSD) sensor, etc.

For example, as shown in FIG. 1C, one cliff sensor among cliff sensors 141c may be installed at a front surface of robot cleaner 100, and two cliff sensors may be installed relatively behind the one cliff sensor.

The arrangement of cliff sensors 141c may be as follows. For convenience, it is assumed that the front cliff sensor is a first sensor, and the rear cliff sensor is a second sensor. Generally, the first and second sensors and may be implemented as the same type of sensors, e.g., PSD sensors. However, the first and second sensors and may be implemented as different types of sensors.

The PSD sensor is implemented as one p-n junction device, and is configured to detect a distance of incident light by using a semiconductor surface resistance. The PSD sensor includes a primary PSD sensor configured to detect light in one direction, and a secondary PSD sensor configured to detect an optical position on a plane. Both of the primary PSD and the secondary PSD have a pin photodiode structure. The PSD sensor is a sort of infrared sensor. The PSD sensor is configured to sense an obstacle by emitting an infrared ray to the obstacle, and measure a distance of robot cleaner 100 from the obstacle, based on an angle of the infrared ray returning after reflection. That is, the PSD sensor calculates a distance of the robot cleaner from the obstacle by using a triangulation method.

The PSD sensor is provided with a light transmitting portion configured to emit an infrared ray to an obstacle, and a light receiving portion configured to receive an infrared ray which returns after being reflected from the obstacle. The light transmitting portion and the light receiving portion are generally implemented in the form of a module. When an obstacle is sensed by using the PSD sensor, the PSD sensor can obtain stable measurement values regardless of reflectivity of an obstacle and a color difference.

Controller 180 may control the first sensor to measure an angle between an emitting signal of an infrared ray emitted toward the ground and a reflecting signal received after being reflected by an obstacle, thereby sensing a cliff and analyzing a depth of the cliff.

Meanwhile, controller 180 may determine whether the robot cleaner is to pass through a cliff sensed by using the first and second sensors and, based on a ground state of the sensed cliff. Controller 180 may determine whether the robot cleaner is to pass through the cliff, based on the determination result. For example, controller 180 may determine the presence of a cliff and a depth of the cliff through the first sensor and then control the robot cleaner to pass through the cliff only when a reflection signal is sensed by the second sensor.

As another example, controller 180 may determine whether robot cleaner 100 is in a levitated state by combining sensing results obtained by the first and second sensors and.

Meanwhile, the lower camera sensor, as shown in FIG. 1C, is provided on a rear surface of robot cleaner 100, to acquire image information on the floor (or a surface to be cleaned) while robot cleaner 100 moves. The lower camera sensor may be called an 'optical flow sensor.' The lower camera sensor generates a predetermine type of image data by converting a down side image inputted from an image sensor provided therein. The generated image data may be stored in storage unit 170.

The lower camera sensor may be further provided with a lens (not shown) and a lens controller (not shown) for controlling the lens. A pan focus type lens having a short focal distance and a deep depth may be used as the lens. The lens controller is provided with a predetermined motor for moving the lens back and forth, and a moving means, thereby controlling the lens.

One or more optical sources may be installed near the image sensor. The one or more optical sources irradiate light onto a predetermined area of the floor captured by the image sensor. That is, if the floor along which robot cleaner 100 is moving is flat, a distance between the image sensor and the floor is constantly maintained. On the other hand, if the floor along which robot cleaner 100 is moving is not even, the distance between the image sensor and the floor becomes long due to a protrusion and an obstacle on the floor. Here, controller 180 may control the one or more optical sources to control the amount of light to be irradiated. The optical source may be a light emitting device capable of controlling an optical amount, e.g., a light emitting diode (LED), etc.

Controller 180 may control the lower camera sensor to sense a position of the robot cleaner regardless of sliding of robot cleaner 100. Controller 180 may calculate a moving distance and a moving direction of robot cleaner 100 by analyzing image data captured by the lower camera sensor according to time, thereby calculating a position of robot cleaner 100, based on the calculated moving distance and moving direction. As image information on a lower side of robot cleaner 100 is acquired by using the lower camera sensor, a position of the robot cleaner having not been precisely calculated by another means due to sliding can be compensated under control of controller 180.

Meanwhile, upper camera sensor 141e, as shown in FIGS. 1A and 1D, may be installed toward an upper side or front side of robot cleaner 100 to capture the periphery of robot cleaner 100. When robot cleaner 100 includes a plurality of upper camera sensors, the upper camera sensors may be formed on an upper surface or side surfaces of robot cleaner 100 with a predetermined distance therebetween or with a predetermined angle.

Upper camera sensor 141e may further include a lens for focusing the camera on a subject, a controller for controlling the camera sensor, and a lens controller for controlling the lens. The lens may be a lens having a wide view angle such that all the peripheral regions, e.g., all the regions on a ceiling can be captured at a predetermined position. For example, the lens may include a lens having a view angle more than a predetermined angle, e.g., 160 degrees or more.

Controller 180 may recognize a position of robot cleaner 100, based on image data captured by the upper camera sensor, and create a map with respect to a cleaning area. Controller 180 may accurately recognize a position of robot cleaner 100, based on image data acquired by an acceleration sensor, a gyro sensor, a wheel sensor, and the lower camera sensor, and image data acquired by the upper camera sensor.

Also, controller 180 may create a cleaning map, based on obstacle information sensed by the front sensor or the obstacle sensor and a position of robot cleaner 100, recognized by the upper camera sensor. Alternatively, the cleaning map is not created by controller 180 but may be input from the outside and stored in storage unit 170.

Hereinafter, robot cleaner 100 performing an operation for preventing collision (e.g., contact) with an obstacle and a controlling method thereof will be described in conjunction with robot cleaner 100 described in FIGS. 1A to 1F.

More specifically, robot cleaner 100 and the controlling method thereof will be described, which can prevent collision (e.g., contact) with an obstacle existing in a path along a traveling direction even when a braking distance is changed depending on friction between driving unit 130 of robot cleaner 100 and the floor.

Also, robot cleaner 100 and the controlling method thereof will be described, which can prevent collision with an obstacle even when an error occurs in sensing unit 140 of robot cleaner 100.

In addition, robot cleaner 100 and the controlling method thereof will be described, which can improve cleaning performance with respect to corner portions in a cleaning area while preventing collision with an obstacle located in the traveling direction of robot cleaner.

Figure 2:
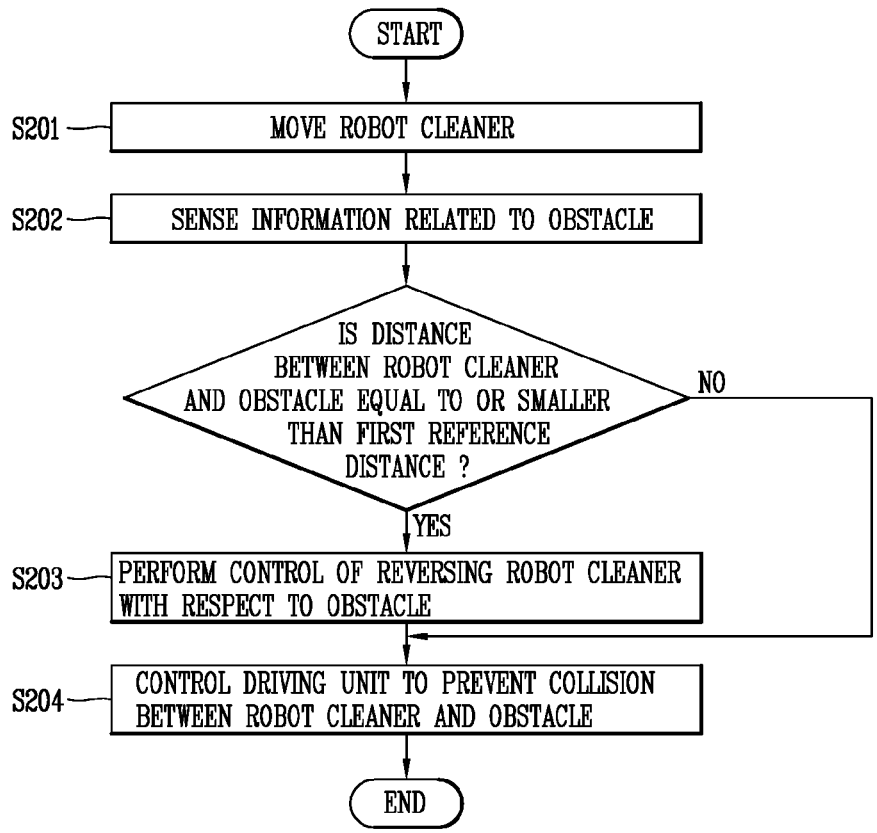
FIG. 2 is a flowchart illustrating an embodiment of the invention of a controlling method of the robot cleaner.

In FIG. 2, an exemplary embodiment of the controlling method of the robot cleaner 100 will be described.

As shown in FIG. 2, driving unit 130 of robot cleaner 100 may move robot cleaner 100 (S201). Specifically, controller 180 may control driving unit 130 such that the main body of robot cleaner 100 is moved based on a predetermined traveling pattern.

For example, controller 180 may control driving unit 130 by using information related the traveling pattern stored in storage unit 170. As another example, controller 180 may control driving unit 130 by using information related to the driving pattern, which is received from an external server, a terminal device, etc.

In an exemplary embodiment, controller 180 may control driving unit 130 to perform a zigzag operation on a predetermined cleaning area. That is, controller 180 may control driving unit 130 to perform a zigzag operation, based on a coordinate axis corresponding to the cleaning area.

Next, sensing unit 140 may sense information related to an obstacle located in a moving direction of robot cleaner 100 (S202).

More specifically, sensing unit 140 may sense the information related to the obstacle at every predetermined time interval. For example, the predetermined time interval may be determined according to attributes of the sensors included in sensing unit 140. As another example, the predetermined time interval may be changed by a user.

In an exemplary embodiment, ultrasonic sensor 141a included in sensing unit 140 may sense information related to an obstacle located in a moving direction of the robot cleaner, based on the main body of the robot cleaner.

As described above in FIG. 1E, ultrasonic sensor 141a may be provided with the signal transmitting portion and the signal receiving portion. In this case, controller 180 may determine whether an ultrasonic wave emitted from the signal transmitting portion has been received by the signal receiving portion after being reflected by an obstacle, etc., and calculate a distance of the robot cleaner from the obstacle by using emission and reception times of the ultrasonic wave.

Also, controller 180 may detect information related to the size of the obstacle by comparing the ultrasonic wave emitted from the signal transmitting portion with the ultrasonic wave received by the signal receiving portion. For example, controller 180 may determine that the size of the obstacle becomes larger as a larger number of ultrasonic waves are received by the signal receiving portion.

Meanwhile, it is illustrated in FIG. 2 that sensing unit 140 senses information related to an obstacle located in a moving direction of the robot cleaner, but the present disclosure is not limited thereto.

That is, sensing unit 140 may sense information related to an obstacle located at the front/rear or left/right, based on the moving direction of robot cleaner 100. Controller 180 may control sensing unit 140 to sense information related to at least one portion of obstacles located in all directions of robot cleaner 100, based on information related to a moving pattern of robot cleaner 100.

Hereinafter, for illustrative convenience, the robot cleaner sensing information related to obstacles located in a traveling direction thereof will be described.

Next, controller 180 may control driving unit 130 to reverse robot cleaner 100 with respect to an obstacle, based on a distance between robot cleaner 100 and obstacle (S203).

Specifically, when the distance to an obstacle from the rotational center of the main body of robot cleaner 100 is equal to or smaller than a first reference distance, controller 180 may control driving unit 130 to reverse the main body.

That is, controller 180 may calculate a distance between the obstacle and robot cleaner 100 by using information related to the obstacle sensed by sensing unit 140. If the sensing unit senses information related to the obstacle at every predetermined time interval, controller 180 may calculate the distance between the obstacle and robot cleaner 100, corresponding to the sensed information.

If the calculated distance is equal to or smaller than the first reference distance, controller 180 may control the robot cleaner to be reversed with respect to the obstacle such that the distance between robot cleaner 100 and the obstacle is increased. In this case, controller 180 may control driving unit 130 to reverse robot cleaner 100 before an operation for preventing collision with the obstacle is performed.

For example, if the distance between robot cleaner 100 and the obstacle is equal to or smaller than the first reference distance after driving unit 130 of robot cleaner 100 completes the performance of a braking operation with respect to the obstacle, controller 180 may control driving unit 130 to reverse robot cleaner 100 with respect to the obstacle.

As another example, when the distance between the obstacle and robot cleaner 100 is within the first reference distance as robot cleaner 100 approaches the obstacle, controller 180 may control driving unit 130 to reverse robot cleaner 100 with respect to the obstacle.

In an exemplary embodiment, the first reference distance may correspond to a radius of rotation of the robot cleaner.

As still another example, when the main body of the robot cleaner is reversed, controller 180 may control driving unit 130 such that a front surface of the main body is spaced apart from the obstacle at a predetermined gap or less. In this case, the predetermined gap may correspond to the radius of rotation.

Here, the radius of rotation may correspond to a distance from the rotational center of the robot cleaner to an outermost point of the robot cleaner. For example, the radius of rotation may correspond to a distance from the rotational center of the robot cleaner to an outermost point of the main body of the robot cleaner. As another example, the radius of rotation may correspond to a distance from the rotational center of the robot cleaner to one end of side brush 192.

Next, controller 180 may control driving unit 130 to prevent collision between the robot cleaner and the obstacle (S204).

Specifically, in order to change the traveling direction of the robot cleaner, controller 180 may control driving unit 130 to rotate the robot cleaner by a predetermined angle.

For example, the predetermined angle may be set to 90 degrees.

Accordingly, in the present disclosure, it is possible to provide a robot cleaner and a controlling method thereof, which can prevent collision with an obstacle due to a change in braking distance of the robot cleaner or a sensor error according to a material of the floor.

That is, in the robot cleaner and the controlling method according to the present disclosure, when a main body of the robot cleaner is rotated to change the moving direction of the robot cleaner, it is possible to prevent collision between the main body and an obstacle.

Particularly, in the robot cleaner and the controlling method according to the present disclosure, when the distance from the rotational center of the robot cleaner to the periphery of the main body is not constant, it is possible to prevent collision with an obstacle while the moving direction of the robot cleaner is being changed with respect to the obstacle.

Figure 3A:
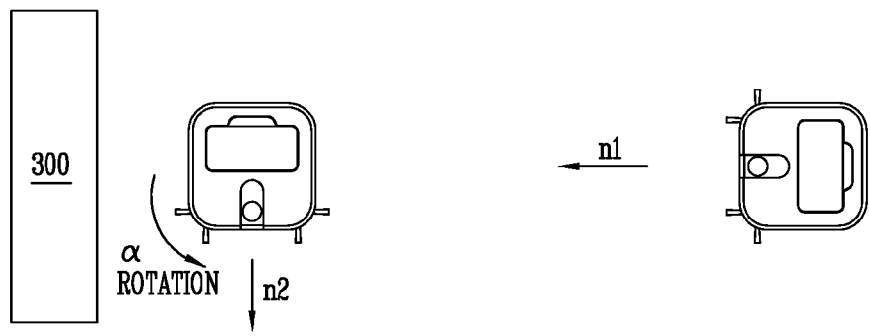
FIGS. 3A and 3B are views illustrating an embodiment of the invention of the robot cleaner performing an operation for preventing collision with an obstacle.

In FIG. 3A, an exemplary embodiment of the robot cleaner for preventing collision with an obstacle and the controlling method thereof will be described.

As shown in FIG. 3A, driving unit 130 of robot cleaner 100 may move (M1) robot cleaner 100 in a specific direction. Driving unit 130 may perform a straight-ahead operation of robot cleaner 100 such that the front surface of the main body of robot cleaner 100 faces the moving direction of robot cleaner 100.

Also, sensing unit 140 may sense information related to an obstacle 300 at a predetermined time interval while robot cleaner 100 is moving.

In addition, controller 180 may calculate a distance between robot cleaner 100 and obstacle 300 by using the information related to obstacle 300, which is sensed by sensing unit 140.

Specifically, controller 180 may calculate a distance from obstacle 300 to the front surface of the main body by using the information sensed by sensing unit 140, and calculate a distance from obstacle 300 to the rotational center of robot cleaner 100. In this case, controller 180 may calculate a distance between robot cleaner 100 and obstacle 300 by using information related to the external appearance of the robot cleaner, which is stored in storage unit 140. For example, the information related to the external appearance of the robot cleaner may include a radius of rotation of the robot cleaner, a distance from the rotational center to the front surface of the main body, etc.

Referring to FIG. 3A, controller 180 may control driving unit 130 to prevent collision of the robot controller with the obstacle. That is, controller 180 may change the traveling direction of the robot cleaner, based on the calculated distance, to prevent collision of the robot cleaner with the obstacle.

For example, as shown in FIG. 3A, if the distance between robot cleaner 100 and obstacle 300 approaches a specific reference distance or less, controller 180 may change the traveling direction of the robot cleaner by a predetermined angle α. After that, controller 180 controls driving unit 130 to move (M2) the robot cleaner 100 in the changed direction, so that it is possible to prevent collision between obstacle 300 and robot cleaner 100. In an exemplary embodiment, the predetermined angle α may be 90 degrees.

Meanwhile, controller 180 may change the angle α at which the moving direction of the robot cleaner is changed, based on the information related to obstacle 300. That is, controller 180 may change the angle α at which the moving direction of the robot cleaner is changed, based on information related to the width of obstacle 300 with respect to movement M1.

Meanwhile, controller 180 may change the angle α at which the moving direction of the robot cleaner is changed, based on a user input.

Figure 3B:
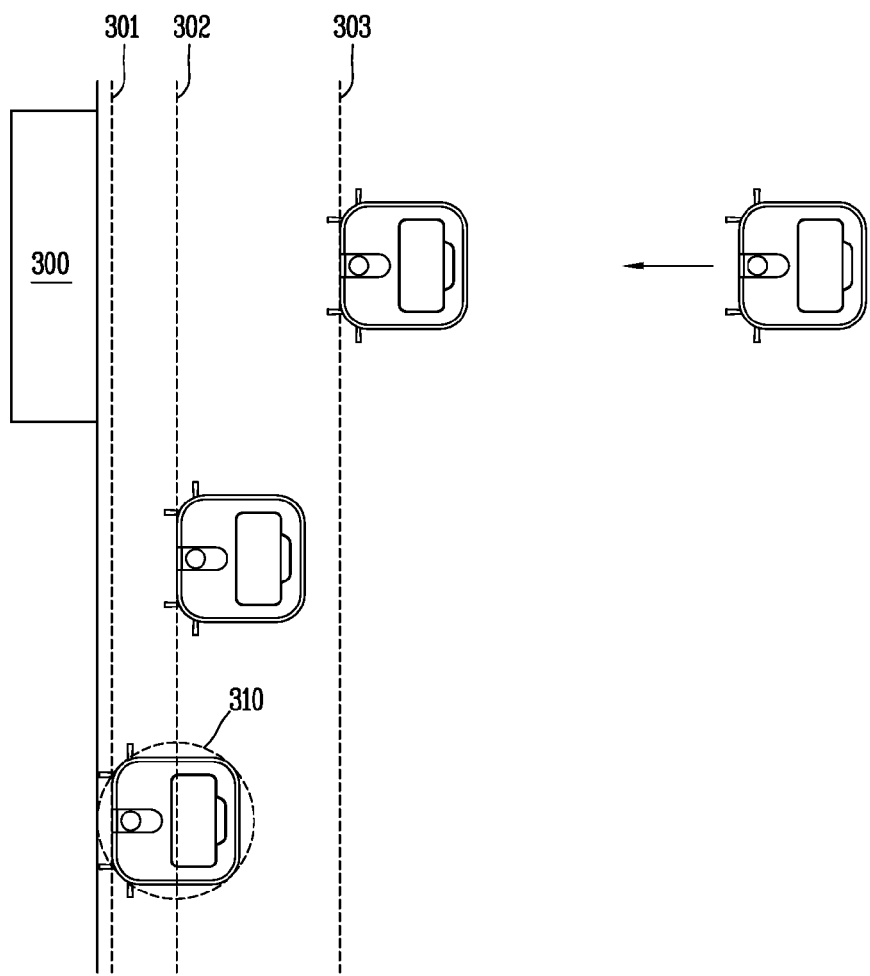

In FIG. 3B, an exemplary embodiment of an operating method of the robot cleaner 100 according to a distance of the obstacle will be described in detail.

Referring to FIG. 3B, controller 180 may control driving unit 130 to prevent collision between obstacle 300 and robot cleaner 100, based on a distance between obstacle 300 and robot cleaner 100.

More specifically, if the distance between obstacle 300 and robot cleaner 100 is decreased to a third reference distance 303 or less, controller 180 may control driving unit 130 to decrease the moving speed of the robot cleaner 100.

For example, controller 180 may perform a braking operation, thereby decreasing the moving speed of robot cleaner 100. As another example, controller 180 may reduce power supplied to driving unit 130, thereby decreasing the moving speed of robot cleaner 100.

In addition, controller 180 may set information related to the third reference distance 303 by using information related to a current speed or average speed of the robot cleaner. Also, controller 180 may set the information related to the third reference distance 303 by using information related to friction between the floor in a cleaning area and driving wheels. That is, third reference distance 303 may be changed based on the moving speed of the robot cleaner or the friction between the floor in the cleaning area and the driving wheels.

Accordingly, if it is determined that an obstacle exists in the moving direction of the robot cleaner, controller 180 of the robot cleaner decreases the moving speed of the robot cleaner, thereby preventing collision of the robot cleaner with the obstacle.

Meanwhile, controller 180 may detect information related to the size of obstacle 300 by using the information sensed by sensing unit 140. Controller 180 may set the information related to the third reference distance, based on the detected information.

Specifically, as described above, sensing unit 140 may include a signal transmitting portion for emitting a predetermined wave to the obstacle 300 and a signal receiving portion for receiving a wave reflected by the obstacle 300. In this case, controller 180 may detect information related to the size of the obstacle by comparing the emitted wave with the received wave. Also, controller 180 may change the third reference distance 303, based on the detected information.

For example, if the amount of the wave received after being reflected by the obstacle increases, controller 180 may decrease the third reference distance 303. If the amount of the wave received after being reflected by the obstacle decreases, controller 180 may increase the third reference distance 303. Accordingly, controller 180 can change the third reference distance 303 where the robot cleaner starts deceleration with respect to the obstacle.

If the distance between obstacle 300 and robot cleaner 100 is decreased to a second reference distance 302 or less, controller 180 may control driving unit 130 to perform a braking operation for stopping robot cleaner 100.

Specifically, controller 180 may set information related to second reference distance 302 by using the information related to the friction between the floor in the cleaning area and the driving wheels. That is, second reference distance 302 may be changed based on the information related to the friction between the floor in the cleaning area and the driving wheels.

Also, controller 180 may set the information related to the second reference distance 302 by using information related to at least one of the radius of rotation of the robot cleaner and the braking distance of the robot cleaner.

If the distance between obstacle 300 and robot cleaner 100 is decreased to a first reference distance 301, controller 180 may control driving unit 130 to reverse robot cleaner 100 with respect to obstacle 300.

Specifically, controller 180 may determine whether the distance between robot cleaner 100 and obstacle 300 is equal to or smaller than first reference distance 301 after robot cleaner 100 performs a braking operation by passing through second reference distance 302. Controller 180 may control driving unit 130 to reverse robot cleaner 100 with respect to obstacle 300, based on the determination result.

That is, if the distance between robot cleaner 100 and obstacle 300 is equal to or smaller than first reference distance 301 after robot cleaner 100 is stopped, controller 180 may change the moving direction of robot cleaner 100 after robot cleaner 100 performs a reverse operation with respect to the obstacle. If the distance between robot cleaner 100 and obstacle 300 is equal to or greater than first reference distance 301, controller 180 may immediately change the moving direction of robot cleaner 100.

Also, controller 180 may set information related to first reference distance 301 by using the related to a radius 310 of rotation of the robot cleaner 100. That is, if the distance between obstacle 300 and the rotational center of robot cleaner 100 is decreased to radius 310 of rotation or less, controller 180 may control the driving unit 130 to reverse robot cleaner 100 with respect to obstacle 300.

In addition, controller 180 may control driving unit 130 to reverse robot cleaner 100 with respect to obstacle 300 by using information related to a predetermined reverse limit distance. That is, controller 180 may control driving unit 130 such that robot cleaner 100 is reversed to the reverse limit distance or less.

Accordingly, in the present disclosure, the robot cleaner determines whether to perform a reverse operation with respect to an obstacle, based on a distance between the robot cleaner and the obstacle, so that it is possible to prevent collision of the robot cleaner with the obstacle and limit the reverse distance of the robot cleaner, thereby improving the operational ratio of the robot cleaner with respect to a cleaning area.

As shown in FIG. 3B, controller 180 may determine whether the distance between the obstacle and the robot cleaner is equal to or smaller than first to third reference distances 301, 302, and 303, based on the distance between the obstacle and the front surface of the main body of the robot cleaner 100.

However, the present disclosure is not limited thereto, and the controller 180 may determine whether the distance between the obstacle and the robot cleaner 100 is equal to or smaller than first to third reference distances 301, 302, and 303, based on the distance between the obstacle and the rotational center of the robot cleaner 100.

Figure 4A:
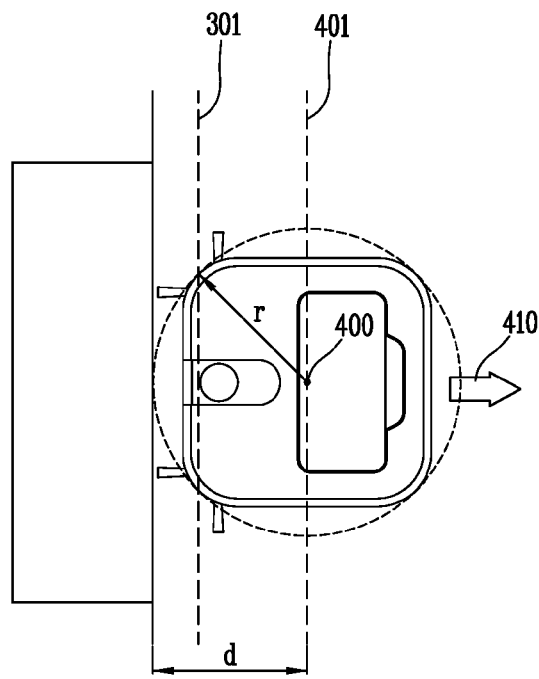
FIGS. 4A and 4B are views illustrating an embodiment of the invention of the robot cleaner performing an operation for preventing collision with an obstacle, in consideration of a radius of rotation.
Figure 4B:
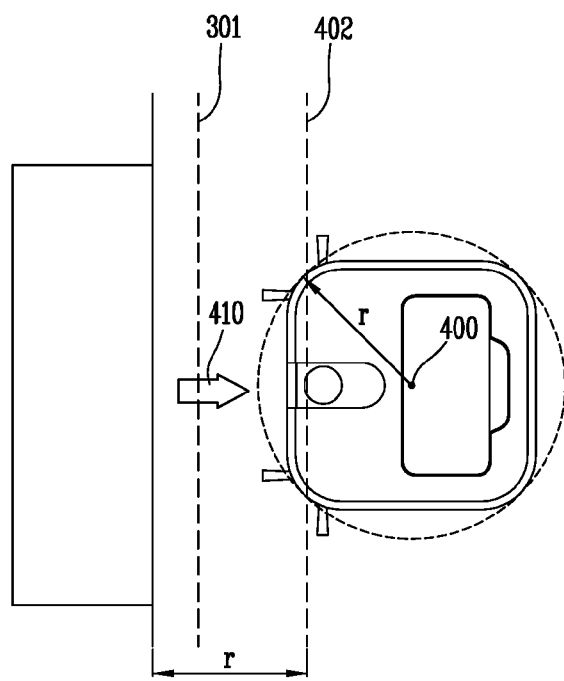

In FIGS. 4A and 4B, an exemplary embodiment of the robot cleaner for preventing collision with an obstacle, in consideration of a radius of rotation of the main body, and the controlling method thereof will be described.

As shown in FIG. 4A, when a distance d from a rotational center 400 of the robot cleaner to the obstacle 300 is equal to or smaller than a radius r of rotation of the main body of the robot cleaner, the controller 180 may control the driving unit 130 such that the robot cleaner is reversed (410) by a predetermined reverse limit distance.

That is, if the distance d from the rotational center 400 of the main body of the robot cleaner to the obstacle 300 is equal to or smaller than the radius r of rotation of the robot cleaner 100, the controller 180 may determine the distance between the obstacle 300 and the robot cleaner 100 is equal to or smaller than the first reference distance 301.

Referring to FIG. 4A, the radius of rotation of the robot cleaner 100 or the radius r of rotation of the main body of the robot cleaner 100 may correspond to a distance from the rotational center 400 to an outermost point of the main body.

Although a front surface of the robot cleaner 100 is spaced apart from the obstacle 300 as long as the main body of the robot cleaner 100 is not formed in a perfect circular shape, collision between the obstacle 300 and the robot cleaner 100 may occur when the robot cleaner 100 performs an avoidance operation with respect to the obstacle 300 or when the robot cleaner 100 performs a rotation operation at the original place.

Thus, in the robot cleaner 100 and the controlling method thereof according to the present disclosure, it is determined whether the robot cleaner 100 is reversed with respect to an obstacle before an avoidance operation for preventing collision of the robot cleaner 100 with the obstacle is performed, based on the radius of rotation of the robot cleaner and the distance between the robot cleaner and the obstacle, thereby preventing the collision that may occur as described above.

Referring to FIG. 4B, when the robot cleaner 100 is reversed, the controller 180 may control the driving unit 130 such that the front surface of the robot cleaner 100 is spaced apart from the obstacle 300 at a predetermined gap or less.

Specifically, when the robot cleaner 100 is reversed before an avoidance operation for preventing collision of the robot cleaner 100 with the obstacle 300 is performed, the controller 180 may control the driving unit 130 such that the front surface of the robot cleaner 100 is spaced apart from the obstacle 300 at the radius of rotation or less.

In FIG. 4B, it is illustrated that the controller 180 is configured to limit the distance by which the robot cleaner is reversed based on the front surface of the robot cleaner, but the present disclosure is not limited thereto. That is, the controller 180 may limit the distance by which the robot cleaner is reversed based on the rotational center of the robot cleaner.

Meanwhile, in FIG. 4B, it is illustrated that the controller 180 is configured to limit the distance by which the robot cleaner is reversed based on a reference line 402 spaced apart from the obstacle 300 at a predetermined gap, but the present disclosure is not limited thereto. That is, as described above, the controller 180 may control the driving unit 130 to reverse the robot cleaner 100 by a predetermined reverse limit distance, so that the distance by which the robot cleaner 100 is reversed can be limited.

Also, when the main body of the robot cleaner 100 is reversed after the main body is stopped, the controller 180 may control the driving unit 130 to reverse the robot cleaner 100 up to a location or point at which the stop of the main body has been started.

Figure 5A:
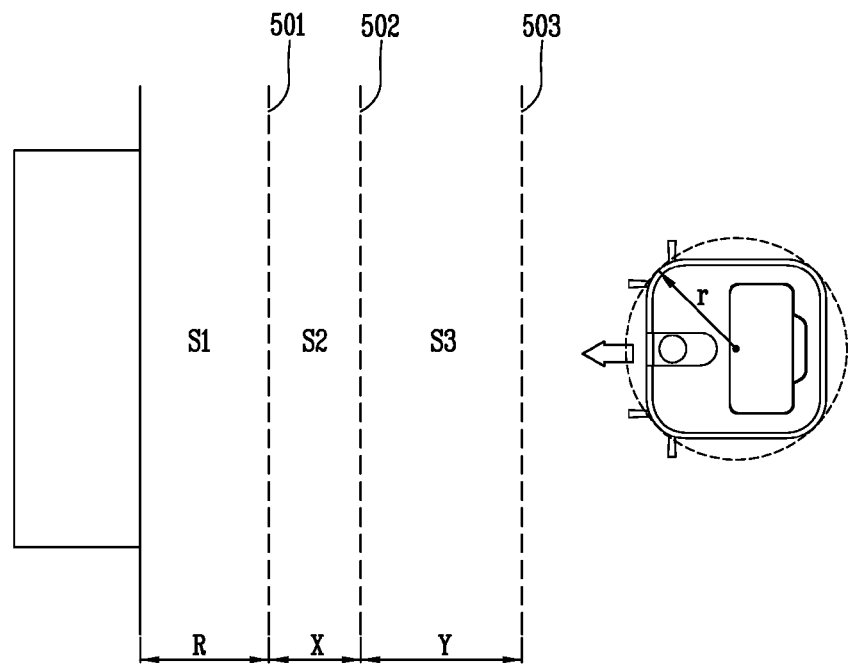
FIGS. 5A and 5B are views illustrating an exemplary embodiment of the invention of a method for controlling the robot cleaner according to a plurality of areas so as to prevent collision with an obstacle.
Figure 5B:
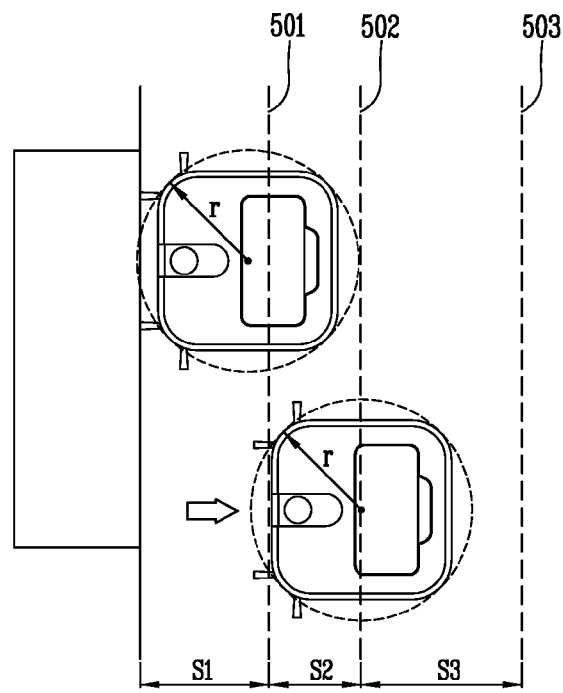

In FIGS. 5A and 5B, an exemplary embodiment of the robot cleaner for preventing collision with an obstacle by using information related to a plurality of areas set based on a distance from the obstacle and the controlling method thereof will be described.

As shown in FIG. 5A, when the rotational center of the robot cleaner 100 enters into a first area S1, the controller 180 may control the driving unit 130 to reverse the robot cleaner 100 with respect to the obstacle 300 before the main body of the robot cleaner 100 is rotated.

More specifically, the controller 180 may set information related to the first area S1 by using information related to the radius r of rotation of the robot cleaner 100. For example, the first area S1 may correspond to an area within the radius r of rotation from the obstacle.

The information related to the radius r of rotation may be previously stored in storage unit 170, transmitted from an external server, or directly input from a user. For example, the controller 180 may search or receive the information related to the radius r of rotation from the external server by using identification information of the robot cleaner.

Referring to FIG. 5A, when the rotational center of the robot cleaner 100 enters into a second area S2, the controller 180 may control the driving unit 130 to stop the robot cleaner 100.

Specifically, the controller 180 may set information related to the second area S2 by using information related to at least one of the radius r of rotation and an average braking distance x of the robot cleaner 100. For example, the second area S2 may correspond to an area within the distance obtained by adding up the radius r of rotation of the average braking distance x.

Controller 180 may control storage unit 170 to store information related to a braking distance whenever a braking operation is performed in robot cleaner 100, thereby forming a database. Controller 180 may set at least one of the information related to the average braking distance x and the information related to the second area S2 by using the formed database. In this case, the database may be formed for each cleaning area of the robot cleaner or each floor material. Accordingly, in the present disclosure, when the robot cleaner perform operations with respect to a plurality of cleaning area, it is possible to effectively prevent collision of the robot cleaner with obstacles even though floor materials of the plurality of cleaning area are different from each other.

As shown in FIG. 5A, when the rotational center of robot cleaner 100 enters into a third area S3, controller 180 may control driving unit 130 to decrease a moving speed of the robot cleaner 100.

Specifically, controller 180 may set information related to the third area S3 by using information related to the radius r of rotation, the average braking distance x, and a speed reduction ratio of the robot cleaner. For example, the third area S3 may correspond to an area within the distance obtained by adding up the radius r of rotation, the average braking distance x, and an average speed reduction distance y form the obstacle.

Controller 180 may set information related to the average speed reduction distance y by using information related to friction between the driving wheels and the floor, etc.

In an exemplary embodiment, the average speed reduction distance y may correspond to a distance by which robot cleaner 100 moves while the speed of robot cleaner 100 is being decreased from a first velocity to a second velocity in a state in which no power is supplied to driving unit 130 of the robot cleaner 100.

Meanwhile, controller 180 may control driving unit 130, based on a moving speed of robot cleaner 100 within the third area and a relative position of robot cleaner 100 with respect to the boundary between second and third areas S2 and S3.

For example, if robot cleaner 100 enters into third area S3, controller 180 may control the power supply unit such that natural braking is performed by cutting off power supplied to driving unit 130. As another example, controller 180 may control driving unit 130 to increase the speed reduction ratio of robot cleaner 100 by using information related to a current speed of robot cleaner 100 and a distance to a current position of robot cleaner 100 from the boundary between second and third areas S2 and S3 after the robot cleaner 100 enters into the third area S3.

As described above with reference to FIG. 5A, first to third areas S1, S2, and S3 may be defined based on a fixed parameter, or flexibly defined based on a material of the floor, an attribute of the robot cleaner, etc.

Referring to FIG. 5B, if the rotational center of robot cleaner 100 enters into first area S1, controller 180 may control driving unit 130 to reverse robot cleaner 100 with respect to obstacle 300.

For example, controller 180 may control driving unit 130 to reverse robot cleaner 100 with respect to obstacle 300 until before the rotational center of robot cleaner 100 is located at the boundary between second and third areas S2 and S3.

As another example, controller 180 may control driving unit 130 to reverse robot cleaner 100 with respect to obstacle 300 up to the position of robot cleaner 100 at a point of time when a control signal related to a stop command is generated in robot cleaner 100.

Meanwhile, in FIGS. 5A and 5B, an exemplary embodiment in which the shape of the obstacle is rectangle has been described for convenience of illustration. However, in the robot cleaner and the controlling method thereof according to the present disclosure, it is possible to prevent collision of the robot cleaner with the obstacle without limiting the shape and external appearance of the obstacle.

Figure 6:
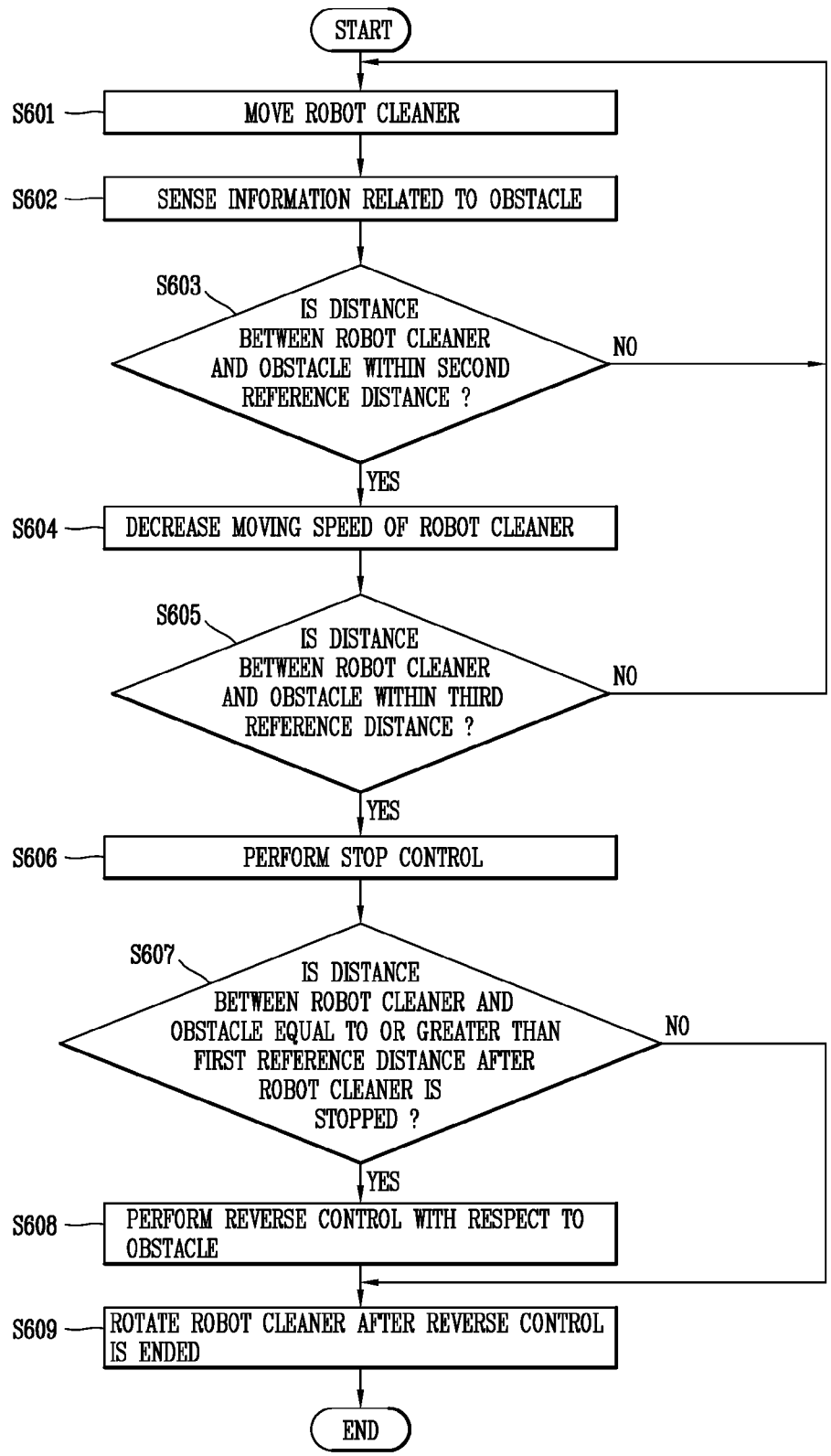
FIG. 6 is a flowchart illustrating an embodiment of the invention of a controlling method of the robot cleaner.

In FIG. 6, an exemplary embodiment of the robot cleaner and the controlling method thereof will be described.

First, driving unit 130 may move robot cleaner 100 (S601). In addition, sensing unit 140 may sense information related to an obstacle (S602).

Next, controller 180 may determine whether the distance between robot cleaner 100 and the obstacle is within the second reference distance by using the sensed information (S603).

Also, controller 180 may control driving unit 130 to decrease a moving speed of robot cleaner 100 (S604).

After that, controller 180 may determine whether the distance between robot cleaner 100 and the obstacle is within the third reference distance by using the sensed information (S605).

If the distance between robot cleaner 100 and the obstacle is within third reference distance, controller 180 may perform stop control to stop the robot cleaner 100 (S606).

After robot cleaner 100 is stopped, the controller 180 may determine whether the distance between robot cleaner 100 and the obstacle is equal to or smaller than first reference distance (S607).

If the distance between robot cleaner 100 and the obstacle is equal to or smaller than the first reference distance, controller 180 may perform reverse control with respect to obstacle (S608).

If the reverse control of robot cleaner 100 is ended, controller 180 may control driving unit 130 such that robot cleaner 100 is rotated at a predetermined angle (S609).

Meanwhile, if the distance between robot cleaner 100 and the obstacle is equal to or greater than the first reference distance after the stop of robot cleaner 100 (S606) is performed, controller 180 may control the driving unit 130 such that the robot cleaner 100 is rotated at predetermined angle (S609).

That is, if the distance between robot cleaner 100 and the obstacle is equal to or greater than the first reference distance after the stop of robot cleaner 100 (S606) is performed, controller 180 does not perform the reverse control with respect to the obstacle but may control driving unit 130 to change the traveling direction of the robot cleaner 100 with respect to the obstacle.

In FIG. 7, an exemplary embodiment of the robot cleaner and the controlling method thereof will be described.

First, driving unit 130 may move robot cleaner 100 (S701). In addition, sensing unit 140 may sense information related to an obstacle (S702).

After robot cleaner 100 is stopped, controller 180 may determine whether the distance between robot cleaner 100 and the obstacle is equal to or smaller than first reference distance (S703).

If the distance between robot cleaner 100 and the obstacle is equal to or smaller than the first reference distance, controller 180 may perform reverse control with respect to the obstacle (S704).

Controller 180 may determine whether the reverse maintenance time has exceeded a predetermined limited time while the reverse control is being performed (S705). For example, the predetermined limited time may be set by a user input.

If the reverse control of robot cleaner 100 is ended, controller 180 may control the driving unit to prevent collision between robot cleaner 100 and obstacle (S706).

Specifically, if the time for which the reverse control of robot cleaner 100 is performed has exceeded the predetermined limited time, controller 180 may determine that the reverse control is ended. Therefore, in order to stop the reverse control of robot cleaner 100, controller 180 may control driving unit 130 to again stop robot cleaner 100.

For example, if the reverse control of robot cleaner 100 is ended, controller 180 may control driving unit 130 to rotate the main body of robot cleaner 100 by a predetermined angle, so as to prevent collision between robot cleaner 100 and the obstacle. As another example, if the reverse control of robot cleaner 100 is ended, controller 180 may control driving unit 130 to prevent collision between robot cleaner 100 and the obstacle by maintaining the distance of robot cleaner 100 from the outer surface of the obstacle.

According to the present disclosure, it is possible to reduce the frequency of collision between the robot cleaner and an obstacle.

Also, according to the present disclosure, it is possible to prevent collision of the robot cleaner with an obstacle even when the braking distance of the robot cleaner is changed depending on friction between the driving wheels of the robot cleaner and the floor.

Also, according to the present disclosure, it is possible to prevent collision of the robot cleaner with obstacles even when an error occurs in information related an obstacle sensed by a sensor of the robot cleaner.

Also, according to the present disclosure, the robot cleaner can effectively perform an avoidance operation with respect to an obstacle, thereby preventing collision or contact of the robot cleaner with the obstacle.

It will be apparent to those skilled in the art that various modifications and variation can be made to the foregoing embodiments of the present invention without departing from the spirit or scope of the invention. Thus, it is intended that the present invention cover the modifications and variations of this invention provided they fall within the scope of the appended claims and their equivalents.

What is claimed is:

1. A robot cleaner comprising:
    a main body;
    a driving unit to move the main body;
    a sensing unit to sense information related to an obstacle; and
    a controller to control the driving unit to prevent the main body from contacting the obstacle,
    wherein the controller is configured to operate a stopping process based on a distance between the main body and the obstacle after the information related to the obstacle is sensed, and
    wherein, after the stopping process is completed, the controller is configured to control the driving unit to directionally reverse the main body with respect to the obstacle when the distance from a rotational center of the main body to the obstacle is less than or equal to a first reference distance so that a front surface of the main body is spaced apart from the obstacle at a predetermined distance.

2. The robot cleaner of claim 1, wherein the first reference distance corresponds to a radius of rotation of the main body.

3. The robot cleaner of claim 2, wherein the predetermined distance between the front surface of the main body and the obstacle corresponds to the radius of rotation of the main body.

4. The robot cleaner of claim 1, wherein, when the main body is directionally reversed, the controller calculates a time for which the reverse of the main body is maintained, and
    wherein, if the calculated time exceeds a predetermined limited time, the controller controls the driving unit to stop the main body from moving.

5. The robot cleaner of claim 1, wherein, if the distance between the main body and the obstacle is decreased to less than or equal to a third reference distance, the controller controls the driving unit to decrease a moving speed of the robot cleaner.

6. The robot cleaner of claim 5, wherein the controller detects information related to a size of the obstacle by using the sensed information, and sets information related to the third reference distance based on the detected information.

7. The robot cleaner of claim 6, wherein the sensing unit includes a signal transmitter for emitting a predetermined wave to the obstacle and a signal receiver for receiving the wave reflected by the obstacle, and
    wherein the controller detects the information related to the size of the obstacle by comparing the emitted wave with the received wave.

8. The robot cleaner of claim 1, wherein, if the distance between the main body and the obstacle is decreased to less than or equal to a second reference distance, the controller controls the driving unit to stop the main body.

9. The robot cleaner of claim 8, wherein, when the main body is reversed after being stopped, the controller controls the driving unit to reverse the main body up to a location at which the stop of the main body has been started.

10. The robot cleaner of claim 8, wherein the controller sets information related to the second reference distance by using information related to at least one of a radius of rotation of the main body and a braking distance of the main body.

11. The robot cleaner of claim 1, wherein the controller controls the driving unit to perform an operation for preventing the main body from contacting the obstacle by rotating the main body by a predetermined angle after the reverse of the main body is completed.

12. A method for controlling a robot cleaner, the method comprising:
    moving, using a driving unit, a main body of the robot cleaner;
    sensing, using a sensing unit, information related to an obstacle located in a moving direction of the main body;
    calculating, using a controller, a distance between the main body and the obstacle by using the sensed information;
    stopping, using a controller, the main body based on the distance between the main body and the obstacle;
    determining, using the controller, whether the calculated distance is less than or equal to a first reference distance after the main body is stopped;
    reversing, using the driving unit, the main body with respect to the obstacle when the calculated distance is less than or equal to the first reference distance; and
    performing, using the controller, an operation for preventing the main body from contacting the obstacle,
    wherein, during the reversing of the main body, the driving unit is controlled so that a front surface of the main body is spaced apart from the obstacle at a distance that is less than or equal to the radius of rotation of the robot cleaner.

13. The method of claim 12, wherein the performing of the operation for preventing the main body from contacting the obstacle includes reversing the main body when a distance from a rotational center of the main body to the obstacle is less than or equal to a first reference distance,
    wherein the first reference distance corresponds to a radius of rotation of the robot cleaner.

14. The method of claim 12, further comprising, stopping the main body if the distance between the main body and the obstacle is less than or equal to a second reference distance.

15. The method of claim 12, further comprising:
    when the main body is reversed, calculating, using the controller, a time for which the reverse of the main body is maintained; and
    stopping the main body if the calculated time is greater than a predetermined limited time.

16. The method of claim 12, further comprising, decreasing a moving speed of the robot cleaner if the distance between the main body and the obstacle is less than or equal to a third reference distance.

17. The method of claim 16, further comprising:
- detecting information related to a size of the obstacle by using the information related to the obstacle; and
- setting information related to the third reference distance based on the detected information.

\* \* \* \* \*